(12) United States Patent
Huchard et al.

(10) Patent No.: US 10,483,651 B2
(45) Date of Patent: Nov. 19, 2019

(54) TRANSMIT-ARRAY ANTENNA COMPRISING A MECHANISM FOR REORIENTING THE DIRECTION OF THE BEAM

(71) Applicant: RADIALL, Aubervilliers (FR)

(72) Inventors: Mathieu Huchard, Grenoble (FR); Cyril Barbier, Voreppe (FR); Laurent Petit, Saint Jean de Moirans (FR)

(73) Assignee: RADIALL, Aubervillers (FR)

( * ) Notice: Subject to any disclaimer, the term of this patent is extended or adjusted under 35 U.S.C. 154(b) by 0 days.

(21) Appl. No.: 16/022,342

(22) Filed: Jun. 28, 2018

(65) Prior Publication Data

US 2019/0006769 A1 Jan. 3, 2019

(30) Foreign Application Priority Data

Jun. 30, 2017 (FR) .................................... 17 56093

(51) Int. Cl.
| | |
|---|---|
| *H01Q 19/06* | (2006.01) |
| *G01S 13/42* | (2006.01) |
| *H01Q 3/14* | (2006.01) |
| *H01Q 19/08* | (2006.01) |
| *H01Q 15/06* | (2006.01) |
| *H01Q 21/00* | (2006.01) |

(52) U.S. Cl.
CPC ......... *H01Q 19/062* (2013.01); *G01S 13/426* (2013.01); *H01Q 3/14* (2013.01); *H01Q 15/06* (2013.01); *H01Q 19/08* (2013.01); *H01Q 21/0018* (2013.01)

(58) Field of Classification Search
USPC ......................................................... 343/754
See application file for complete search history.

(56) References Cited

U.S. PATENT DOCUMENTS

| | | | | |
|---|---|---|---|---|
| 4,823,136 | A * | 4/1989 | Nathanson | G01S 7/032 342/368 |
| 5,675,349 | A | 10/1997 | Wong | |
| 8,010,062 | B2 * | 8/2011 | Rofougaran | H01Q 1/2258 342/359 |
| 10,116,066 | B2 * | 10/2018 | Schaepperle | H01Q 9/0435 |
| 2007/0285327 | A1 | 12/2007 | Paschen et al. | |

OTHER PUBLICATIONS

Search Report issued in French Patent Application No. 1756093, dated Feb. 26, 2018.

* cited by examiner

*Primary Examiner* — Brian K Young
(74) *Attorney, Agent, or Firm* — Arent Fox LLP

(57) ABSTRACT

The present invention relates to a transmit-array radiofrequency antenna comprising: a support; a transmit-array arranged in a plane, called a transmission plane; at least one focal source fixed on the support and arranged at the focal length from the array; and a displacement mechanism for moving the transmit-array, the mechanism being connected to the support and being adapted to translationally move the transmit-array in at least one of the two directions in the transmission plane.

10 Claims, 3 Drawing Sheets

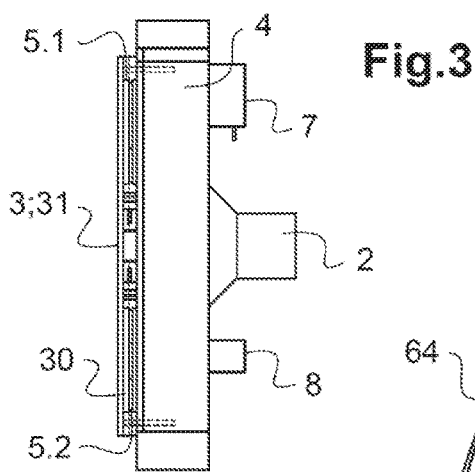
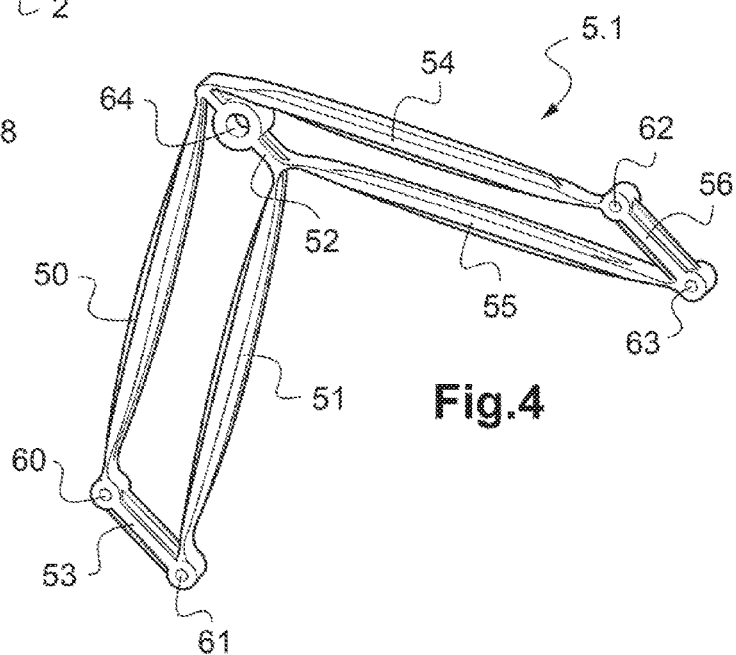
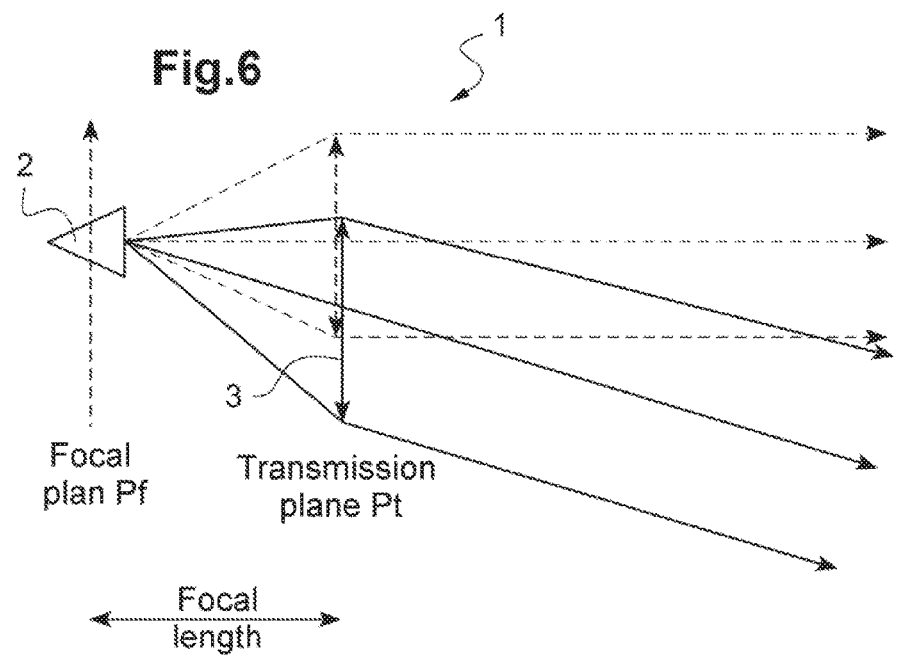

TRANSMIT-ARRAY ANTENNA COMPRISING A MECHANISM FOR REORIENTING THE DIRECTION OF THE BEAM

CROSS REFERENCE TO RELATED APPLICATION

This application claims priority of French Patent Application No. 1756093, filed Jun. 30, 2017, the contents of which are hereby incorporated by reference in its entirety.

TECHNICAL FIELD

The present invention relates to the field of transmit-array antennae.

More specifically, it contemplates proposing a solution for dynamically reorienting the direction of the antenna beam.

The preferred applications contemplated by the invention are antennae operating in the microwave range, preferably in the range between 57 to 66 GHz. However, the invention is also applicable over the entire millimeter wave frequency band (30 to 300 GHz). The market that is mainly contemplated by the invention is that of fixed point-to-point connections, with a distance typically ranging between 100 m and 10 km, at high bit rates, typically from 1 to 10 Gbits, for telecommunication applications. This type of connection is mainly used in infrastructures for mobile networks for the 4G, 5G standards, in the dedicated connections between buildings (campus, companies) and is considered to be key technology for the future 5G access points intended to be integrated in urban property.

However, the invention may find other fields of application, particularly radar detection applications, in which the depointing obtained by the antenna according to the invention may be used to scan in a field of vision.

PRIOR ART

Transmit-array antennae belong to the four main categories of antennae that enable high directivity antennae to be produced, the other three categories being the antennae referred to as:
- radiating aperture antennae, for example, antennae of the horn type;
- reflector antenna, for example, parabolic antennae comprising a single reflector or Cassegrain antennae comprising two reflectors;
- phased-array antennae, formed by a line or a matrix of lower directivity antennae, supplied by a supply network designed using transmission line technology, for example, a microstrip or waveguide line.

A sub-category of the phased-array antennae is formed by active electronically controlled phased-array antennae allowing dynamic modification of the radiating pattern.

The transmit-array antennae are similar to the phased-array antennae in that they are also formed by a matrix of basic antennae with lower directivity but differ therefrom since they are not supplied via transmission lines.

Such a transmit-array antenna is shown in FIG. 1. The antenna generally denoted using reference numeral 1 is formed by one or more focal sources 2, also called primary source, illuminating a transmit-array 3, generally produced by a printed circuit 30, arranged in a plane transverse to the axis of the focal source 2 and parallel thereto. The one or more focal source(s) is/are placed at a distance, called focal length, from the array, which focal length is defined by the array.

The transmit-array 3 is formed by a matrix of basic cells 31, for example, patch antennae, for example, arranged as a matrix in rows and columns.

Each basic cell 31 is formed by a radiating element 32 operating as a receiver, which is arranged on the face of the circuit 30 on the side of the focal source 2, and a radiating element 33 operating as a transmitter on the face of the circuit 30 on the side opposite the focal source. By virtue of the principle of reciprocity, the transmit-array also operates in reception.

The two elements 32, 33 are connected together by a circuit imposing a predetermined phase shift on the radiofrequency signal transmitted between the receiving 32 and transmitting 33 elements.

The transmit-array 3 may be synthesized by the basic cells 30, which follow a predetermined phase rule according to their position on the array. More specifically, an advantageous phase rule is a converging lens.

Thus, by knowing the position and the radiation features of the focal source, it is possible to pre-compute the phase rule of the transmit-array so that the incident radiation coming from the source, the wavefront of which is approximately spherical, is retransmitted in the form of a flat wave.

The transmit-array then performs like a converging lens. The antenna thus emits a directional beam in the main direction, whilst maintaining radiation that is low and is lower than a pattern specified in the other directions.

The transmit-array 3, as shown in FIG. 1, is commonly manufactured using integrated circuit technology called multilayer technology.

The focal source 2 operates like a horn type antenna with an optimized section profile. The sections are optimized to improve the illumination of the transmit-array with performance similar to that of a lens.

The focal source 2 is supplied by a rectangular waveguide input.

In the field of directive antenna for fixed point-to-point connections, antenna misalignment is an unwanted phenomenon, according to which the electromagnetic beam emitted by this antenna undergoes angular deviation, under the effect of an external disruption (wind, impacts, earthquake, deformation of the support, any overload).

In order to compensate for this misalignment, the implementation of dynamic depointing has already been sought, i.e. solutions for dynamically controlling the direction of the beam emitted by the antenna. By thus maintaining perfectly aligned beams, it is possible to guarantee a gain, as well as a constant and optimal link budget independently of any disruptions.

In particular, in the field of radiofrequency (RF) antennae, two categories of solutions have already been used to carry out depointing of a directive beam.

The first category is an electronic solution in a phased-array antenna, called active electronically controlled phased-array antenna or active electronically scanned array.

In such an antenna, the directive beam is formed by placing a large number of radiating elements on the array.

This type of antenna is commonly implemented for radar applications but not for fixed point-to-point connection applications, which require lower dynamic performance levels and which have a lower acceptable manufacturing cost.

The radiating elements are supplied by a supply network, the purpose of which is to distribute the radiofrequency signal. Circuits are used to control the phase shifting of the RF signal distributed to each radiating element. Modifying the phase rule applied to the various radiating elements allows the direction of the main beam to be controlled and modified.

Various production techniques have been demonstrated and are commonly used to produce the phase shifting circuits, particularly transistor or diode based electronic circuits or circuits based on materials with piezoelectric properties or based on microelectromechanical systems (MEMS).

Compared to the existing mechanical depointing solutions, these techniques offer the advantages of faster beam switching, of being less sensitive to vibrations and of having a longer theoretical lifetime.

They have the disadvantages of being more complex and more expensive to implement at high frequencies, such as at the millimeter wave frequencies, in particular in the 28-140 GHz range, and at the dimensions required to obtain high gains, typically greater than 25 decibels relative to isotropic (dBi).

Finally, intrinsically, phased-array antennae are less efficient than transmit-array antennae due to the greater electrical losses introduced by the supply network and the phase shifting circuits. Furthermore, their energy consumption is generally higher.

The second category is a mechanical solution using a gimbal system.

Thus, the antennae are mounted on a mechanical support pivoting via a gimbal joint. The rotation movement of the antenna is driven and controlled by the motors of the gimbal system and allows the directions to be scanned by azimuth and/or by elevation. The disadvantages of this solution are a scanning speed that is limited by the dynamic performance levels of the gimbal system, a lifetime that is limited by the wear of the movable parts and greater sensitivity to vibrations.

Compared to the phased-array antennae, the advantages of this mechanical gimbal solution involve obtaining better antenna efficiency, higher gains, in particular at millimeter wave frequencies, lower cost and production complexity.

Finally, several transmit-array antenna solutions may be cited or solutions may be cited that operate according to a similar principle and are capable of carrying out dynamic depointing of the beam by means of an electronically controlled variable phase shifting circuit. These are then integrated on each basic cell between the receiving element and the transmitting element of the transmit-array. These circuits may be produced (as in the case of the electronically controlled phased-array antennae) by transistor or diode based electronic circuits, by circuits based on materials with piezoelectric properties or based on RF MEMS.

Thus, U.S. Pat. No. 6,677,899 B1 implements a solution according to this principle in the X band (8-12 GHz) for a radar application.

Publication [1] demonstrates the implementation of a transmit-array integrating active phase shifting circuits in the Ka band (27-31 GHz).

However, none of the solutions has yet been able to be implemented in the V (57-66 GHz) or E (71-86 GHz) bands. Indeed, when the frequency increases, the size of the basic cell of the transmit-array, proportional to the wavelength, decreases and no technology exists for producing the phase shifting circuits within the dimension constraint required in these bands and at an acceptable cost for fixed point-to-point connection telecommunication applications.

No dynamic depointing solution allowing the direction of the beam to be dynamically controlled has been contemplated to date for transmit-array antennae.

Therefore, a requirement exists for improving the operation of transmit-array antennae, particularly in order to obtain dynamic depointing of their beam, without the disadvantages of the existing solutions in the field of radiofrequency antennae.

The aim of the present invention is to respond to all or part of this requirement.

DISCLOSURE OF THE INVENTION

To this end, the aim of the invention is a transmit-array radiofrequency antenna comprising:
  a support;
  a transmit-array arranged in a plane, called transmission plane, the transmit-array comprising a printed circuit and a plurality of basic cells produced in a central zone of the printed circuit;
  at least one focal source fixed on the support and arranged at the focal length from the array;
  a displacement mechanism for moving the transmit-array, the displacement mechanism being connected to the support and being adapted to translationally move the transmit-array in at least one of the two directions in the transmission plane, the displacement mechanism being connected to the printed circuit in its peripheral zone;
  wherein the displacement mechanism comprises:
  two servomotors;
  two first devices, called pantograph devices, each comprising two deformable parallelograms each formed by four articulation segments connected pairwise by a flexible articulation forming a pivot link and one of the segments of which is common to the two parallelograms,
  in which displacement mechanism, the common segment of each of the two first pantograph devices is connected to one of the two servomotors, whereas one of the segments parallel to the common segment is fixed on the printed circuit in its peripheral zone and the other one of the segments parallel to the common segment is fixed on the support, the connection between each of the common segments with one of the two servomotors being carried out such that one of the servomotors may move the common segment of one of the two first devices and hence move the printed circuit in approximately one of the two directions (X) in the transmission plane, whereas the other one of the servomotors may move the common segment of one of the two first devices and hence move the printed circuit in approximately the other one of the two directions (Y) in the transmission plane.

Preferably, the movement mechanism is adapted to translationally move the transmit-array in the two directions of the transmission plane.

The use of pantograph devices to limit and impose translation movement in the transmission plane, transverse to the axis of the primary source, is particularly advantageous.

Indeed, firstly, such devices are simple, inexpensive to produce and allow high speed to be achieved in the transmission of the translation movement.

Subsequently, in each pantograph, the segments that are respectively connected to one of the servomotors, to the printed circuit and to the support remain parallel to each other regardless of the movement and thus the angle formed with the other segments of the parallelogram.

Therefore, the translation movement is only conferred by the flexible articulations, which excludes the rotation movements of the transmit-array along an axis normal to the focal plane, the rotation movements along an axis colinear to the focal plane, as well as the translation movements in a direction normal to the focal plane. The two degrees of freedom of the desired translation movement are exclusively controlled by the two servomotors.

Preferably, the two first pantograph devices are arranged at 90° to each other so as to allow the movement of the devices to be controlled by the two servomotors practically orthogonal to each other.

According to an advantageous variation, each of the two common segments is connected by a shaft to one of the two servomotors, which shaft is adapted to slide in an opening produced in the support, the shape of the opening being adapted to move the printed circuit in approximately one of the directions (X or Y) in the transmission plane.

According to yet another advantageous embodiment, the displacement mechanism further comprises:

two other devices, called pantograph devices, each comprising two deformable parallelograms each formed by four articulation segments connected pairwise by a flexible articulation forming a pivot link and one of the segments of which is common to the two parallelograms, in which displacement mechanism:

the common segment of each of the two other pantograph devices is free;

one of the other parallel segments is fixed on the printed circuit in its peripheral zone;

the other one of the parallel segments is fixed on the support in its peripheral zone.

This embodiment with four pantographs at 90° to each other is particularly advantageous since it provides greater robustness due to the greater number of fixing points on the printed circuit of the transmit-array and it also has a minimum spatial requirement, which is optimal since each pantograph is arranged in a corner of a square around the transmit-array.

Advantageously, each pantograph device is a one-piece part, preferably made of thermoplastic, more preferably made of polypropylene. Thus, in this case, the flexible connections are only produced by deformation of the thermoplastic, which is advantageous since fewer parts are required to produce the pantograph devices.

The focal source is preferably of the horn antenna type.

The invention further relates to an antenna array comprising a plurality of antennae as previously described, in a patch antenna array.

Finally, the invention relates to a radiofrequency (RF) antenna formed by a transmit-array antenna as previously described.

Typically, for an RF antenna operating around 60 GHz with a focal length of 50 mm, in which the transmit-array undergoes a translation movement of approximately +/−10 mm relative to its nominal position, the dynamic depointing of the antenna beam may be approximately +/−10°.

Thus, the invention basically involves providing a transmit-array antenna with an additional function of translationally moving the transmit-array relative to the primary source.

By enabling the translation movement of the array in at least one direction in the transmission plane, it is possible to control/dynamically depoint the direction of the beam emitted by the antenna.

Dynamic depointing of the direction of the main beam advantageously is carried out in a cone of several tens of degrees around the main axis of the antenna. Typically, by virtue of the invention, dynamic depointing operations for the antenna beam may be contemplated up to angles of +/−20 degrees.

The invention allows a transmit-array antenna to achieve electrical performance levels that are comparable to reflector antennae, in terms of gain and antenna efficiency, with lower complexity and production costs and with higher dynamic performance levels compared to those of an antenna mounted on a movable mechanical support.

These higher performance levels are achieved by moving only one component, namely the transmit-array and its printed circuit. This component is light compared to the weight of the complete structure. Therefore, the dynamic performance levels are better than those of an antenna fully mounted on a movable mechanical support with a gimbal joint, with equivalent costs, complexity and consumption.

Furthermore, the movement of the transmit-array is only a translation movement in a plane and not a rotation movement by azimuth and by elevation, as is the case for an antenna according to the prior art, which is mounted on a movable mechanical support.

Consequently, the displacement mechanism according to the invention is easier to produce.

Furthermore, the entire antenna, with its displacement mechanism according to the invention, may be housed under a radome, without this requiring a significant change to the form factor of the antenna.

In order to obtain dynamic depointing of a transmit-array antenna, a person skilled in the art could move the focal source (or the receiver) instead of moving the transmit-array, as is the case according to the invention.

However, in practice this solution is not advantageous. Indeed, if a manufactured antenna has to be placed on an item of equipment, then electrically connecting the entire movable antenna to the client equipment must be contemplated, which would involve modifying said equipment. However, due to the very nature of the installations, there is a requirement to avoid modifying client equipment when a transmit-array antenna is installed thereon.

Another solution that may be contemplated by a person skilled in the art involves multiplying the number of sources (or of receivers) in the focal plane and successively supplying them with electrical power through selective switching (publication [2]). The relative movement between the focal sources and the transmit-array would then be unnecessary, but this would involve, on the one hand, greater complexity and thus higher production costs and, on the other hand, angular discretization of the depointing of the beam.

Indeed, the more directive the antenna, the narrower its main beam. Thus, in order to cover the same given angular sector (for example, +/−10 degrees) with a more directive antenna (for example, 40 dBi instead of 30 dBi), the number of focal sources would need to be multiplied, thus increasing the complexity and the production cost.

More specifically, for any 3 dBi increase in gain, the number of focal sources should be multiplied by a factor of 2 in order to maintain the same angular resolution.

By contrast, in the case of the present invention, the proposed mechanism allows a continuous movement, and thus depointing, to be obtained. Thus, the same mechanism is suitable independently of the directivity of the antenna. This solution therefore proves to be more economical for proposing antennae with ever higher directivity. Only the precision of the movement by the servomotors may possibly be improved.

DETAILED DESCRIPTION

Further advantages and features of the invention will become more clearly apparent upon reading the detailed description of embodiments of the invention, which is provided by way of a non-limiting example, with reference to the following figures, in which:

FIG. 3 is a side view of the antenna according to FIG. 2;

FIG. 4 is a perspective view of one of the pantograph devices of the mechanism for moving the reflector-array according to the invention;

FIG. 6 is a schematic view showing the dynamic depointing of a beam of a reflector-array antenna obtained according to the invention.

Figure 1:
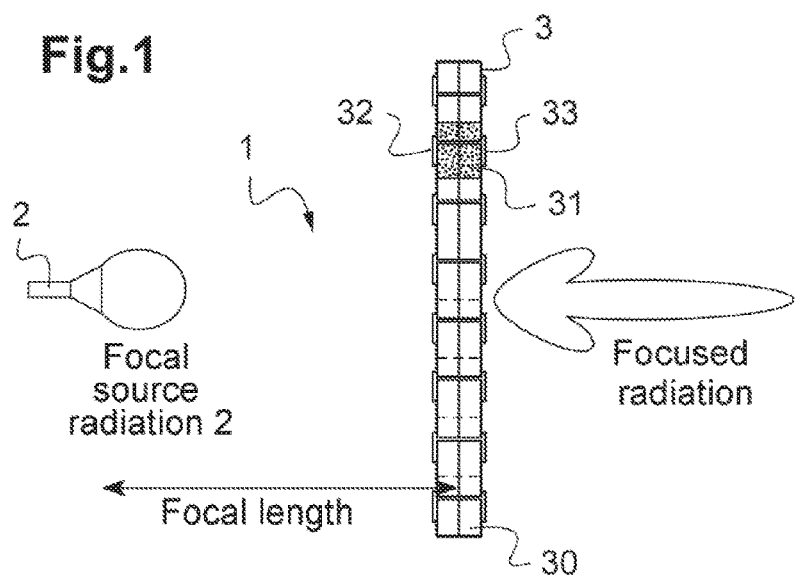
FIG. 1 is a schematic view of a reflector-array antenna according to the prior art.

FIG. 1 relating to the prior art has already been discussed in the preamble. Therefore, it is not described hereafter.

For the sake of clarity, the same elements of a transmit-array antenna according to the prior art and a transmit-array antenna according to the invention are denoted using the same reference numerals.

Figure 2:
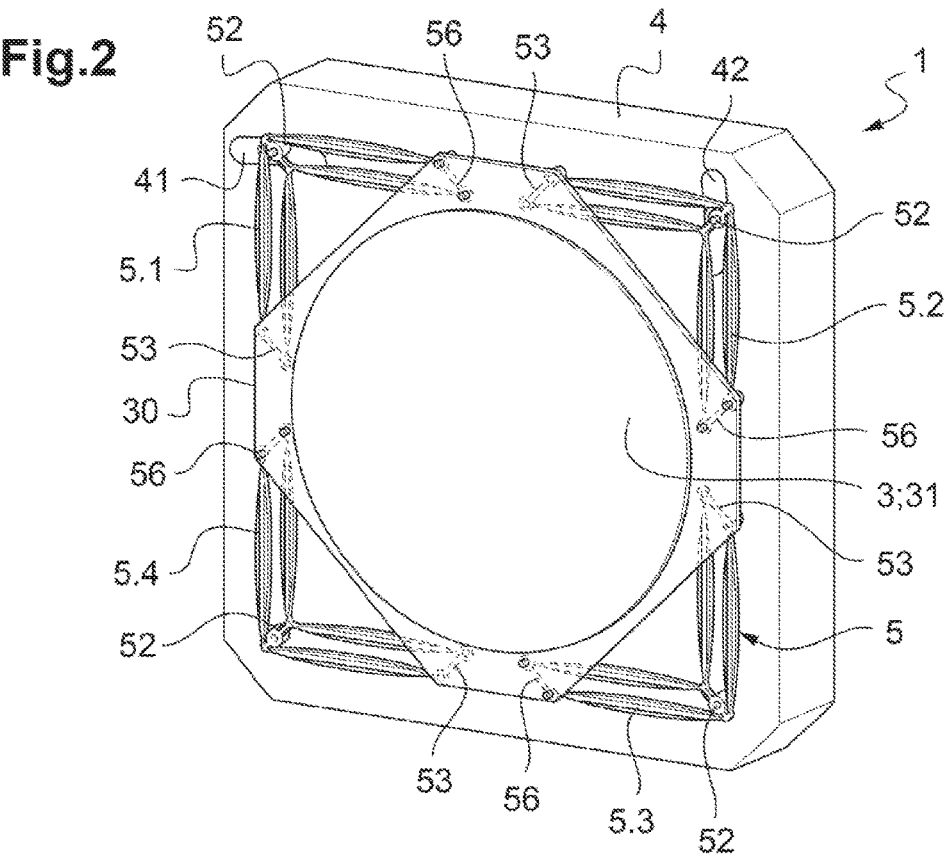
FIG. 2 is a perspective view of a reflector-array antenna according to the invention provided with its four-pantograph mechanism for moving the transmit-array.
Figure 5:
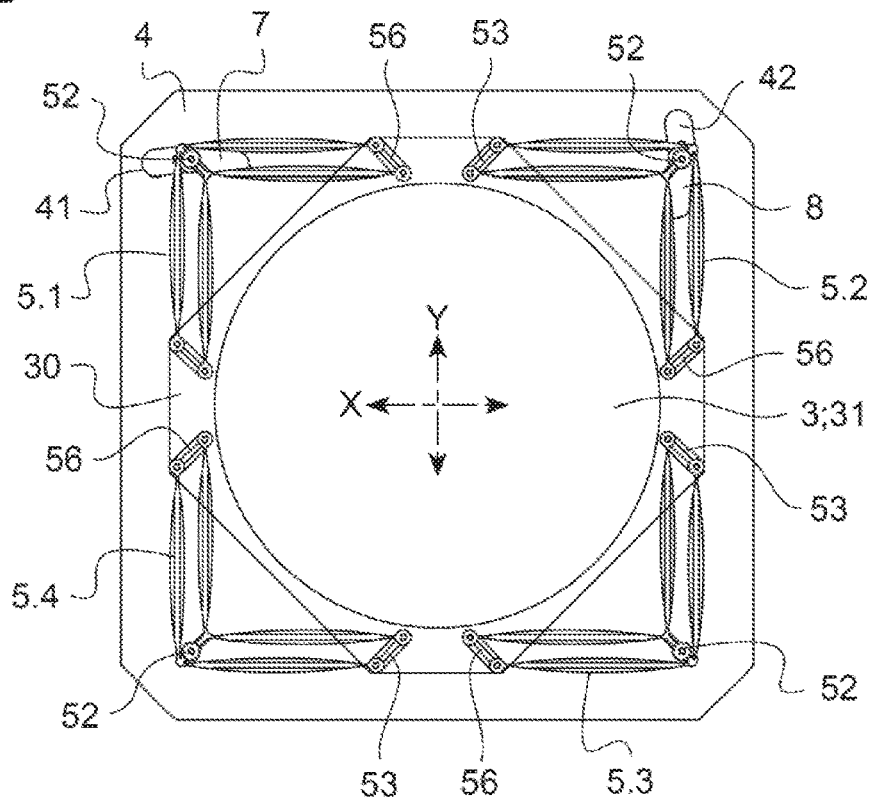
FIG. 5 is a front view of the antenna according to FIG. 2.
Figure 5A:
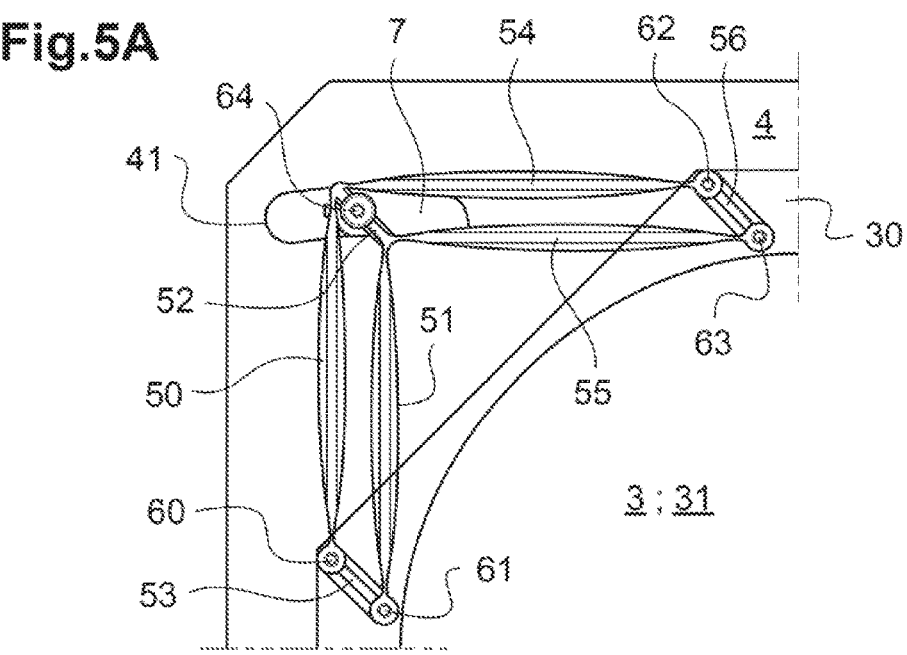
FIG. 5A is a detailed view of FIG. 5 showing the connection of one of the pantograph devices to one of the servomotors for translationally moving the transmit-array in a direction.

FIGS. 2, 4, 5 show a transmit-array antenna 1 according to the invention.

The antenna 1 firstly comprises a support 4, on which the focal source 2 is fixed on the side opposite the transmit-array 3.

The transmit-array 3 is arranged above the support 4 in a transmission plane parallel to the focal plane of the source 2.

This array 3 comprises a printed circuit 30 and a plurality of basic cells 31 produced in a central zone of the printed circuit 30. As will be seen from FIG. 2, the general shape of the printed circuit 30 is square, whereas the shape of the central zone of the printed circuit is circular. However, the central zone may be square.

According to the invention, a displacement mechanism 5 connected to the printed circuit 30 in its peripheral zone allows the transmit-array 3 to translationally move in the two directions X, Y in the transmission plane.

As will be seen from FIGS. 2, 4 and 5, the arrangement of the displacement movement mechanism 5 does not interfere with the central zone of the printed circuit 30, which therefore supports the basic cells 31. In other words, the central zone 31 remains transparent, and this is the case regardless of the translation movement of the array 3. The movement of the transmit-array 3 in an approximate direction X in the transmission plane is enabled by a servomotor 7 fixed on the support 4 on the side opposite the array 3, whereas the movement in the other approximate direction Y in the transmission plane is enabled by another servomotor 8, which is also fixed on the support 4 on the side opposite the array 3.

To ensure that the translation movement is imposed in the transmission plane, the displacement mechanism 5 comprises four pantograph devices 5.1, 5.2, 5.3, 5.4, which are identical and are arranged by being evenly distributed around the central zone of the printed circuit 30, i.e. at 90° to each other, as will be explained hereafter.

The movement obtained by each pantograph device is not strictly linear, but is in a large diameter circle and therefore at least two devices 5.1, 5.2 allow an approximate movement respectively in direction X and perpendicular direction Y.

Four pantograph devices ensure that the fixing of the transmit-array 3 is robust, without as such increasing the spatial requirement of the antenna.

The production of one 5.1 of these pantograph devices will now be described with reference to FIG. 4.

This device 5.1 is a one-piece part, advantageously made of polypropylene.

It comprises two deformable parallelograms each formed by four articulation segments 50, 51, 52, 53 and 52, 54, 55, 56 connected pairwise by a flexible articulation forming a pivot link. Therefore, the flexible articulations are produced by tapering the material of the part between two adjacent segments.

The segment 52 is common to the two parallelograms.

Thus, each device 5.1, 5.2, 5.3, 5.4 is called pantograph device since, regardless of the angle formed between the segments, the segments 52, 53 and 56 always remain parallel to each other.

Each of the articulation segments is perforated with at least one housing defining a fixing point either on the printed circuit 30 or on the support 4 or on the output shaft of one of the servomotors 7, 8. Each of these fixings or catches may be produced by means of screws, preferably made of plastic, or even by clipping or other means.

More specifically:
  the segment 53 is fixed on the support 4 by two fixing points 60, 61;
  the segment 56 is fixed on the printed circuit 30 of the array 3 by two fixing points 62, 63;
  the common segment 52 is either free or is fixed to the output shaft of one of the servomotors 7, 8 by a single, preferably central, fixing point 64.

Even more specifically, the connection via the point 64 between the common segment 52 of the device 5.1 and the servomotor 7 allows said servomotor to move the common segment 52 and hence move the printed circuit 30 in approximately the direction (X) in the transmission plane.

The connection via the point 64 between the common segment 52 of the device 5.2 and the servomotor 8 allows the servomotor to move the common segment 52 and hence move the printed circuit 30 in approximately the direction (Y) in the transmission plane.

In order to guide the movement of the printed circuit over a predetermined course, the support 4 is perforated with two emerging openings 41, 42 of predetermined length.

The point 64 of each of the devices 5.1 or 5.2 may slide in each of these openings 41 or 42 when it is translationally moved by either one of the servomotors 7 or 8.

FIG. 6 schematically shows the movement operation of the antenna 1 according to the invention, as previously described, which allows dynamic depointing of its beam.

By virtue of the displacement mechanism 5, the transmit-array 3 translationally moves in a transmission plane Pt parallel to the focal plane Pf. The position of the source 2 still remains constrained in the focal plane of the array 3.

Thus, with the movement mechanism 5, the beam of the antenna may be emitted (the solid lines in FIG. 6) by several degrees around the main axis of the antenna by which the nominal beam is emitted (dashed lines in FIG. 6).

Other variations and improvements may be made without necessarily departing from the scope of the invention.

The invention is not limited to the aforementioned embodiments. In particular, features of the illustrated embodiments may be combined together within variations that are not shown.

The term "comprising a" must be understood to mean "comprising at least one", unless otherwise specified.

CITED REFERENCES

[1] L. Di Palma, A. Clemente, L. Dussopt, R. Sauleau, P. Potier, and P. Pouliguen, "Circularly-Polarized Reconfigurable Transmitarray in Ka-Band with Beam Scanning and Polarization Switching Capabilities," *IEEE Trans. Antennas Propag.*, vol. 65, no. 2, pp. 529-540, February 2017.

[2] A. Moknache et al., "A switched-beam linearly-polarized transmit array antenna for V-band backhaul applications," in 2016 *10th European Conference on Antennas and Propagation (EuCAP)*, 2016, pp. 1-5.

The invention claimed is:

1. A transmit-array radiofrequency antenna comprising:
a support;
a transmit-array arranged in a transmission plane, the transmit-array comprising a printed circuit and a plurality of basic cells produced in a central zone of the printed circuit,
at least one focal source, fixed on the support and arranged at the focal length from the array;
a displacement mechanism for moving the transmit-array, the mechanism being connected to the support and being adapted to translationally move the transmit-array in at least one of the two directions in the transmission plane, the displacement mechanism being connected to the printed circuit in its peripheral zone;
wherein the displacement mechanism comprises:
two servomotors;
two first pantograph devices, each comprising two deformable parallelograms each formed by four articulation segments connected pairwise by a flexible articulation forming a pivot link and one of the segments of which is common to the two parallelograms,
in which displacement mechanism, the common segment of each of the two first pantograph devices is connected to one of the two servomotors, whereas one of the segments parallel to the common segment is fixed on the printed circuit in its peripheral zone and the other one of the segments parallel to the common segment is fixed on the support, the connection between each of the common segments with one of the two servomotors being carried out such that one of the servomotors may move the common segment of one of the two first devices and hence move the printed circuit in approximately one of the two directions (X) in the transmission plane, whereas the other one of the servomotors may move the common segment of one of the two first devices and hence move the printed circuit in approximately the other one of the two directions (Y) in the transmission plane.

2. The transmit-array radiofrequency antenna according to claim 1, wherein the displacement mechanism is adapted to translationally move the transmit-array in the two directions of the transmission plane.

3. The transmit-array radiofrequency antenna according to claim 1, wherein the basic cells are patch antennae.

4. The transmit-array radiofrequency antenna according to claim 1, wherein each of the two common segments is connected by a shaft to one of the two servomotors, which shaft is adapted to slide in an opening produced in the support, the shape of the opening being adapted to move the printed circuit in approximately one of the directions (X or Y) in the transmission plane.

5. The transmit-array radiofrequency antenna according to claim 1, wherein the displacement mechanism further comprises:
two other pantograph devices, each comprising two deformable parallelograms each formed by four articulation segments connected pairwise by a flexible articulation forming a pivot link and one of the segments of which is common to the two parallelograms,
in which displacement mechanism:
the common segment of each of the two other pantograph devices is free;
one of the other parallel segments is fixed on the printed circuit in its peripheral zone;
the other one of the parallel segments is fixed on the support in its peripheral zone; and
the four pantograph devices are distributed at 90° to each other around the central zone of the printed circuit.

6. The transmit-array radiofrequency antenna according to claim 1, wherein each pantograph device is a one-piece part.

7. The transmit-array radiofrequency antenna according to claim 6, wherein the one-piece part is made of thermoplastic.

8. The transmit-array radiofrequency antenna according to claim 1, wherein the focal source is of the horn antenna type.

9. An antenna array comprising a plurality of radiofrequency antennae according to claim 1.

10. The transmit-array radiofrequency antenna according to claim 7, wherein the thermoplastic comprises polypropylene.

* * * * *